(12) United States Patent
Hoefflin et al.

(10) Patent No.: US 8,163,380 B2
(45) Date of Patent: Apr. 24, 2012

(54) DAMPING COMPOSITION WITH IMPROVED BAKABILITY

(75) Inventors: Frank Hoefflin, Royal Oak, MI (US); Hua Ning, Rochester, MI (US); Patricia Heidtman, Livonia, MI (US)

(73) Assignee: Sika Technology AG, Baar (CH)

( * ) Notice: Subject to any disclaimer, the term of this patent is extended or adjusted under 35 U.S.C. 154(b) by 1260 days.

(21) Appl. No.: 11/731,654

(22) Filed: Mar. 30, 2007

(65) Prior Publication Data

US 2008/0241566 A1    Oct. 2, 2008

(51) Int. Cl.
*B32B 5/16*   (2006.01)
*B32B 27/00*  (2006.01)
*B32B 27/08*  (2006.01)
*B05D 3/00*   (2006.01)
*B05D 3/02*   (2006.01)

(52) U.S. Cl. ........ 428/323; 428/500; 428/515; 427/331; 427/372.2

(58) Field of Classification Search .......... None
See application file for complete search history.

(56) References Cited

U.S. PATENT DOCUMENTS

| | | | |
|---|---|---|---|
| 3,131,158 A * | 4/1964 | Kemp et al. ............. | 524/16 |
| 3,640,833 A | 2/1972 | Oberst et al. | |
| 3,904,456 A | 9/1975 | Schwartz et al. | |
| 4,089,832 A * | 5/1978 | Yamauchi et al. ......... | 524/503 |
| 4,325,858 A | 4/1982 | Saito et al. | |
| 4,391,857 A | 7/1983 | Saito et al. | |
| 4,735,284 A | 4/1988 | Gahlau et al. | |
| 5,512,619 A * | 4/1996 | DeWacker et al. ........ | 524/56 |
| 5,584,950 A * | 12/1996 | Gaffigan ............... | 156/71 |
| 6,077,613 A | 6/2000 | Gaffigan | |
| 6,153,709 A | 11/2000 | Xiao et al. | |
| 6,265,475 B1 * | 7/2001 | Chifei et al. ............ | 524/127 |
| 6,646,042 B2 | 11/2003 | Wu et al. | |
| 6,820,923 B1 | 11/2004 | Bock | |
| 6,841,251 B2 | 1/2005 | Desai et al. | |
| 2002/0161102 A1 * | 10/2002 | Benton et al. ........... | 524/502 |

FOREIGN PATENT DOCUMENTS

JP        54-160492     * 12/1979

* cited by examiner

*Primary Examiner* — Sheeba Ahmed
(74) *Attorney, Agent, or Firm* — Rader, Fishman & Grauer PLLC

(57) ABSTRACT

Compositions for damping the vibration of mechanical components, such as those used in vehicles, are disclosed and described. The compositions comprise a water-based polymer resin and a drying control agent. The drying control agent minimizes the occurrence of cracks and swelling in the damping coating films when the coating films are baked and dried.

36 Claims, 2 Drawing Sheets

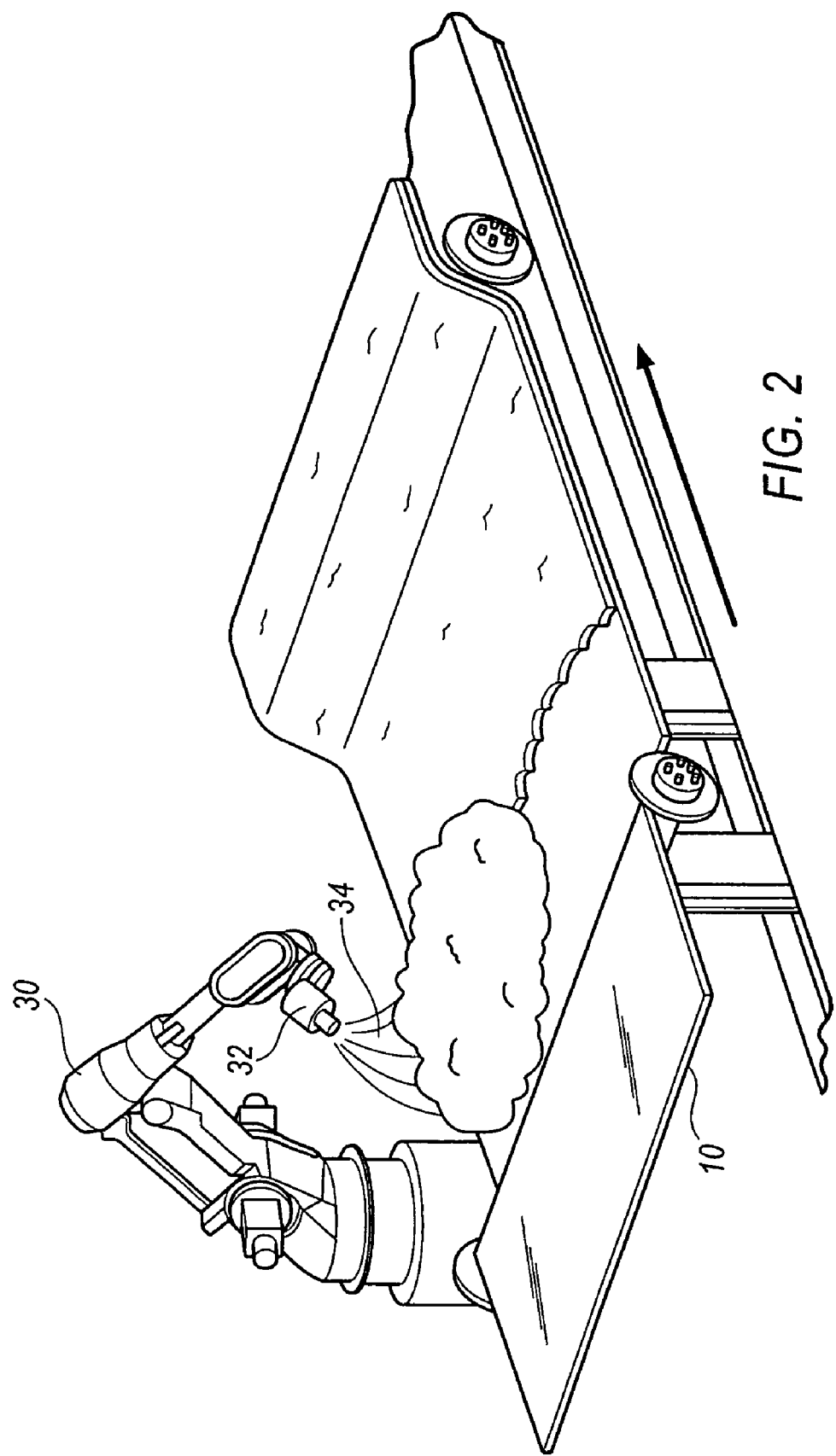

DAMPING COMPOSITION WITH IMPROVED BAKABILITY

FIELD

The present disclosure relates to compositions used to dampen noise and vibration in mechanical structures, and more particularly, concerns damping compositions with an improved ability to withstand drying and baking processes.

BACKGROUND

Undesirable vibration energy occurs in a variety of products and devices. For example, in automotive vehicles, the engine and other automotive systems can cause vibration to permeate through the vehicle body and into the vehicle's passenger compartment. Similar undesirable vibration energy occurs in a variety of other situations, such as in household appliances and other types of transportation vehicles, to name a few.

To reduce undesirable vibration energy, vibration damping materials, such as polymer resin materials, may be applied to the surfaces of mechanical components subjected to vibrational disturbances. Such damping materials dissipate a portion of the vibrational energy applied to them. For vehicle applications, such damping materials may be applied to a number of surfaces of the vehicle panels, floors, etc. to reduce the vibration or noise felt by the vehicle occupant.

In the past, many damping resins were commercially supplied in an organic solvent in order to adjust their viscosities, thereby allowing the resins to be coated or otherwise applied to a substrate. To reduce the cost and potential hazard of disposing of organic solvents, water-based polymer resins have increasingly replaced solvent-based materials. However, water-based resins suffer from certain drawbacks. In certain applications, vibration damping materials (such as those used in automobiles) may be subjected to heating during forming or finishing processes (e.g., when vehicle surfaces are painted and baked). When exposed to such heating operations, the water phase may quickly evaporate, causing the resin to crack and/or bubble, thereby compromising its structural integrity and impairing its damping performance.

Thus, a need has arisen for a damping composition that addresses the foregoing.

SUMMARY

A damping composition is provided which comprises a water-based resin and a polysaccharide drying control agent. In one embodiment, the polysaccharide is cellulose. In another embodiment, the polysaccharide is a starch. In a further embodiment, the starch is water insoluble.

A damping composition is also provided which comprises a water-based resin and an alkali-soluble polymer drying control agent. In one embodiment, the alkali-soluble polymer is an acrylic polymer. In another embodiment, the alkali-soluble polymer is a copolymer of an acrylic ester and a carboxylic ester.

A damping composition is provided which comprises a water-based resin and a drying control agent selected from the group consisting of a polyvinyl alcohol-stabilized latex and a polyvinyl alcohol powder. In one embodiment, the drying control agent is a polyvinyl alcohol-stabilized vinyl acetate latex. In another embodiment, the polyvinyl alcohol-stabilized vinyl acetate latex is selected from the group consisting of a polyvinyl alcohol-stabilized ethylene vinyl acetate copolymer latex, a polyvinyl alcohol-stabilized polyvinyl acetate latex and mixtures thereof.

A vibration damped system is provided which comprises a substantially rigid substrate having a damping composition applied thereon. The damping composition comprises a water-based resin and a drying control agent. The substantially rigid substrate is subjected to vibrational disturbances.

A method of manufacturing a product having a vibration-damped substrate that is subjected to vibrations is provided. The method comprises providing the substrate, combining a drying control agent and a water-based resin to produce a damping composition, and applying the damping composition to the substrate. In an exemplary embodiment, the step of applying the composition to the substrate comprises spraying the composition on the substrate.

BRIEF DESCRIPTION OF THE DRAWINGS

The foregoing brief description, as well as further objects, features and advantages of the present invention will be understood more completely from the following detailed description of presently preferred embodiments, with reference being had to the accompanying drawings in which:

FIG. 2 is a depiction of a process for applying a damping composition onto a substrate, such as a vehicle panel.

DETAILED DESCRIPTION

Figure 1:
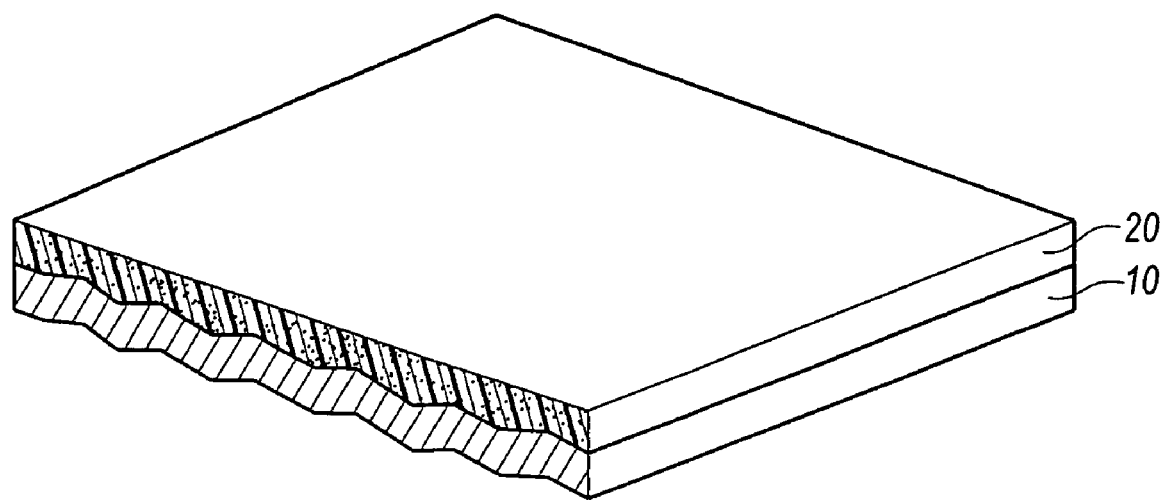
FIG. 1 is a perspective view of a substrate, such as an automotive panel, with a damping composition applied thereto.

Referring to FIG. 1, an illustrative example of an article with a damping material applied to it is depicted. In the example, substrate 10 is generally a metal or other substantially rigid material which is subjected to external vibrational disturbances. For example, substrate 10 may comprise the floor of an automobile which is subjected to vibrational disturbances from the operation of the vehicle engine. Damping material 20 is applied to substrate 10 to reduce the amount of vibration experienced by the vehicle occupant due to the vibrational disturbances imposed on substrate 10. Substrate 10 may be a vehicle floor, a portion of a trunk, a portion of a dashboard or other components that experience vibration. Although automotive applications are referred to by way of example, damping material 20 may be applied to any mechanical structures or components that are subjected to vibration, such as household appliances, flooring, machine shells, washer/dryers, airplanes, boats, or various tools.

Set forth below are various embodiments of compositions suitable for use as damping material 20. The damping compositions comprise a water-based polymer resin and a drying control agent. As used herein, the terms "water-based resin" or "water-based polymer resin" refer to polymeric materials that are combined with water and/or polymeric materials that are formed by polymerizing their constituent monomers in a water medium. Water-based resins include but are not limited to latexes, emulsions, water-reducible dispersions, and solutions of a polymer or polymer blends in water. While not wishing to be bound by any theory, it is believed that when such water-based resins are combined with the drying control agents described herein and subjected to a drying or heating process, the drying control agent slows or retards the rate at which water evaporates from the polymer resin, thereby reducing the propensity for cracking and/or bubbling in the damping material.

As indicated previously, to avoid the costs and environmental concerns associated with solvent-based resin systems, water-based resins are generally preferred for damping material 20 (FIG. 1). In one embodiment, a damping material is provided which comprises a latex and a thickener that acts as a drying control agent. The damping ability of damping material 20 can be characterized by the composite loss factor ("CLF") as determined by the Oberst test method (for example, SAE J1637) and/or the loss factor (tan δ) as determined by Dynamic Mechanical Analysis. While the desired damping characteristics are typically application dependent, in one embodiment, damping material 20 preferably has a minimum CLF value of 0.1 and a minimum tan δ of about 2.0. Suitable water-based resins comprise any polymers made from any possible monomer combinations, and mixtures thereof, including but not limited to acrylic polymer (including co-polymer) latexes, styrene-acrylic copolymer emulsions, styrene-butadiene copolymer latexes, vinyl acetate emulsions (including but not limited to polyvinyl acetate ("PVAc") emulsions and ethylene vinyl acetate ("EVA") copolymer emulsions), vinyl-acrylic copolymer emulsions and the like. Preferred water-based resins include styrene-butadiene emulsions, acrylic ester emulsions, ethylene-vinyl acetate emulsions, and mixtures thereof.

Suitable drying control agents include alkali-soluble polymers (including but not limited to alkali-soluble copolymer latexes of carboxylic acids and acrylic esters), polyvinyl alcohol ("PVOH") powders, PVOH-stabilized polymers (including but not limited to PVOH-stabilized vinyl acetate latexes such as EVA copolymer latexes and PVAc latexes), and polysaccharides (including but not limited to starches and celluloses). In addition, other optional ingredients may be included to enhance damping properties and/or improve processing, including but not limited to fillers, defoamers, plasticizers, wetting agents, surfactants, dispersing agents, and micro biocides. Suitable fillers could be any non-latex particulate solids, either inorganic or organic. Examples are calcium carbonate, talc, fibers, bubble spheres, barium sulfate, zeolites, mica, graphite, calcium silicate, clay, mixtures or combinations of the foregoing, and the like.

Suitable acrylic latexes for the water-based resin component of damping material 20 include acrylic polymers and copolymers having a glass transition temperature of from about −20° C. to about 50° C. The solids content of the acrylic latex ranges generally from about 45 percent to about 65 percent by weight, with a solids content of from about 48 percent to about 58 percent by weight being preferred. One exemplary acrylic latex is Acronal® DS 2159, a product of BASF corporation. Acronal® DS 2159 is an acrylic ester copolymer emulsion having a solids content of from about 49 percent to about 51 percent by weight. It forms films having a glass transition temperature of about 12° C. Another exemplary acrylic latex is Acronal® DS 3502, an aqueous dispersion of an acrylic copolymer which is also a product of BASF Corporation. Acronal® DS 3502 has a solids content of from about 54 percent to about 56 percent by weight and forms films with a glass transition temperature of about 4° C. An additional exemplary acrylic latex is Hycar 26349, a product of Noveon Inc. Another exemplary acrylic latex is NeoCryl A-1120, a product of DSM Neoresins. When acrylic latexes are used to form damping material 20, the latex preferably is added in an amount (i.e., including both the solid and water phase) that is generally from about 15 percent to about 65 percent by weight of the total damping composition, with amounts ranging from about 30 percent to about 50 percent by weight being preferred, and amounts ranging from about 35 percent to about 45 percent by weight being especially preferred. Blends of acrylic latexes may also be used.

Suitable water-based resins also include styrene-butadiene copolymer latexes having a glass transition temperature of from about −20° C. to about 50° C. The solids content of the styrene-butadiene latex ranges generally from about 45 percent to about 65 percent, with a solids content of from about 48 percent to about 58 percent being preferred. One exemplary styrene-butadiene latex is GenCal 7463, a product of Omnova Solutions, Inc. of Fairlawn Ohio. GenCal 7463 is a modified styrene/butadiene latex with a percent solids of about 53 percent. Another exemplary styrene-butadiene copolymer latex is Styronal® ND 656, a product of BASF Corporation. Styronal® ND 656 is a carboxylated styrene/butadiene dispersion that has a solids content of from about 49 percent to about 51 percent and which forms films with a glass transition temperature of about 18° C. When styrene-butadiene water-based resins are used to form damping material 20, the resin is preferably added in an amount (i.e., including both the solid and water phase) that is generally from about 15 percent to about 65 percent by weight of the total damping composition, with amounts ranging from about 30 percent to about 50 percent being preferred, and amounts ranging from about 35 percent to about 45 percent being especially preferred.

Suitable EVA water-based resins include those having EVA copolymer latexes with a glass transition temperature of from about −20° C. to about 50° C. The EVA latex preferably has a percent solids ranging from about 45 percent to about 70 percent by weight, with a solids content of from about 50 percent to about 65 percent by weight being preferred. An exemplary EVA latex is Airflex® 426, a carboxylated EVA emulsion which can also serve as a drying control agent when combined with another latex, as discussed below. Airflex® 426 is a high solids, PVOH-stabilized emulsion of an ethylene-vinyl acetate copolymer supplied by Air Products & Chemicals Corporation of Allentown, Pa. The percent solids of Airflex® 426 is from about 62 percent to about 64 percent by weight and the glass transition temperature of the EVA resin is about 0° C. The amount of PVOH stabilizer is about two (2) percent by weight of the total latex composition. When EVA latexes are used to form damping material 20, they are preferably added in an amount (including both resin and the water phase) ranging from about 10 percent to about 30 percent by weight of the total damping composition, with EVA latex amounts ranging from about 15 percent to about 25 percent being preferred.

As mentioned above, the damping materials described herein preferably comprise a thickener that acts as a drying control agent. One suitable type of such a thickener is an alkali-soluble polymer (including but not limited to co-polymers of acrylic esters and carboxylic acids). The alkali-soluble polymer is preferably provided as an aqueous dispersion comprising about 20 percent to about 30 percent solids by weight, with about 24 percent to about 26 percent solids by weight being more preferred. In one embodiment, the alkali-soluble polymer is rich in acid groups and is provided as an emulsion with a pH of from about 2 to about 3. One exemplary alkali-soluble polymer is Latekoll® D, an anionic, aqueous dispersion of an acrylic ester/carboxylic acid copolymer supplied by the BASF Corporation. Latekoll® D has a solids content of from about 24 percent to about 26 percent and is an alkali soluble thickener with a pH of from about 2 to about 3. Another exemplary alkali-soluble polymer is Acrysol ASE-60, an alkali swellable, cross-linked, acrylic thickener supplied by Rohm & Haas. Acrysol ASE-60 is an anionic aqueous dispersion having a percent solids of about 28 percent and pH of about 2.9. While not wishing to be bound by any theory, it is believed that the alkali soluble thickeners described herein produce polymer chain entanglement in the water-based resin component of damping composition 20, resulting in increased water retention and a retardation of water evaporation during drying processes.

When alkali-soluble polymer thickeners are used as drying control agents, they are preferably provided in an amount (including both resin and water) that ranges generally from about 0.1 percent to about 2.0 percent of the total damping composition by weight, with amounts of from about 0.4 percent to about 1.0 percent being preferred.

Another type of thickener that is suitable as a drying control agent is PVOH. In one embodiment, the PVOH is supplied as a dried powder. Suitable PVOH powders include but are not limited to Celvol® 125 and Celvol® 203, which are supplied by Celanese Corporation, and Elvanol® 70-03, which is supplied by DuPont.

In another exemplary embodiment, the PVOH is supplied as a component of a latex, such as a PVOH-stabilized vinyl acetate latex. One exemplary drying control agent that comprises a PVOH-stabilized latex is Airflex® 426. Without wishing to be bound by any theory, it is believed that the addition of PVOH powder or a PVOH-stabilized latex to the damping compositions described herein produces hydrogen bonding between the resin and water phases, which retards the rate of evaporation during heating or drying processes. In one exemplary embodiment, the amount of PVOH added to the damping composition is about 0.2 percent to about 5.0 percent by weight of the total damping composition. When PVOH-stabilized EVA is used as a drying control agent, it is preferably provided as a latex comprising from about 50 percent to about 70 percent solids by weight and from about 1 percent to about 5 percent PVOH by weight, wherein the EVA latex is present in an amount (including both resin and water) ranging generally from about 10 percent to about 30 percent of the total damping composition (by weight), with PVOH-stabilized EVA latex amounts ranging from about 15 percent to about 25 percent being preferred.

Another illustrative example of a PVOH-stabilized vinyl acetate thickener that acts as a drying control agent is Mowlith DN 50, a product of Hoechst AG of Germany. Mowlith DN50 is a PVOH-stabilized PVAc polymer. It is supplied as an emulsion with about 54 percent solids by weight and has a glass transition temperature of about 30° C. When PVOH-stabilized PVAc drying control agents are used, they are preferably supplied as a PVAc latex comprising from about 50 percent to about 70 percent solids by weight, wherein the PVAc latex is added in an amount (including both resin and water) generally ranging from about five (5) percent to about 30 percent by weight of the total damping composition, with PVAc amounts ranging from about 10 percent to about 25 percent being preferred.

While both PVOH-stabilized EVA and PVOH-stabilized PVAc may serve as drying control agents when combined with other latexes, latexes of PVOH-stabilized EVA and PVOH-stabilized PVAc can also be combined with one another to provide a damping composition that retards the rate of water evaporation during heating processes. When combinations of PVOH-stabilized EVA and PVAc are used, the EVA is preferably provided as a latex comprising from about 50 percent to about 70 percent solids, wherein the EVA latex is present in an amount generally ranging from about 10 percent to about 30 percent by weight of the total composition, with amounts of from about 15 percent to about 25 percent being preferred. The PVAc is preferably provided as a latex comprising from about 50 percent solids to about 70 percent solids and is present in the same amount as the EVA latex. An exemplary damping composition comprising a combination of a PVOH-stabilized EVA copolymer latex and a PVOH-stabilized polyvinyl acetate latex is a blend of Airflex® 426 and Mowlith DN50.

Polysaccharides are another exemplary type of thickener that acts as drying control agent. Preferred polysaccharides include starches and cellulose. It has been discovered that during a heating operation (such as a baking operation in a paint oven), water combines with the polysaccharide to form a gel which retards the rate of water evaporation and minimizes the appearance of cracks and bubbles. Preferred starches include non-water soluble starches such as Waxy® 7350, an unmodified corn starch, and Pearl starch, an unmodified dent corn starch, each of which is supplied by Tate & Lyle, PLC of Belgium.

If a polysaccharide drying control agent is used, it is generally present in an amount ranging from about 0.1 percent to about 20 percent by weight of the total damping composition, with amounts of from about 1 percent to about 10 percent being preferred. An amount of from about 1 percent to about 5 percent is especially preferred.

In general, the damping compositions described herein are prepared by combining the various components in a high speed mixer. Numerous types of mixing equipment may be used depending on the amount of material desired, for example, a Lab Dissolver for bench scale mixing and any other high speed mixers which are common for industry use. In one embodiment, the wet components of the damping composition (e.g., resins, defoamers, surfactants) are first added to the mixing apparatus and are then mixed at a speed of from about 1000 rpm to about 1400 rpm for about 10 minutes to about 15 minutes. Fillers are then added at a low speed, such as about 600 to about 800 rpm for a period of from about 5 minutes to about 20 minutes. The mixing speed is then increased to a speed of from about 1000 rpm to about 1400 rpm for a period of from about 1 minute to about 10 minutes. If solid drying control agents (e.g, polysaccharides or PVOH powder) are used, they are then added. However, they may also be added immediately after the wet components are mixed. In the case of wet drying control agents (e.g., vinyl acetate polymer latexes or alkali-soluble polymer latexes), the drying control agent may be added after the resins and fillers.

To better illustrate the benefits of the drying control agents described herein, set forth below are exemplary compositions that illustrate the effects of such agents on the baking of various damping materials.

Example I

Polysaccharide Drying Control Agent—Control Formulation

A pre-mix was first prepared by combining 60 g of Acronal® DS 2159, 60 g of Acronal® DS 3502, 1.2 g of Tamol 731 (a wetting agent comprising a 25 percent sodium salt of polymeric carboxylic acid supplied by Rohm and Haas of Philadelphia, Pa.), 1.5 g Triton X45 (a surfactant supplied by Dow Chemical of Midland, Mich.), and 15 g of deionized water. The pre-mix was mixed in a high speed mixer at 1250 rpm for about 15 minutes. 180 g of HuberCarb Q325 $CaCO_3$ filler was then added to the pre-mix at a mixer speed of 800 rpm for about 10 minutes. Mixing was then continued for another 5 minutes at 1200 rpm. 1.5 g of Latekoll® D was then added at 700 rpm until the mixture was homogeneous.

Example II

Non-Water Soluble Starch as a Drying Control Agent

A pre-mix was prepared as described in Example I. 36 g of Waxy 7350 starch was added to the pre-mix at a mixing speed of 1000 rpm for about 10 minutes. 144 g of HuberCarb Q325 $CaCO_3$ filler was then added at a mixing speed of 1000 rpm for about 10 minutes. Mixing was then continued at a speed of 1250 rpm for about 5 minutes. 1.5 g of Latekoll® D was then added at 700 rpm until the mixture was homogeneous.

Example III

Non-Water Soluble Starch as Drying Control Agent

This formulation was prepared in the same manner as the formulation of Example II, except that 36 g of Pearl Starch was used in place of the 36 g of Waxy 7350 starch.

Example IV

Water Soluble Starch as a Drying Control Agent

This formulation was prepared in the same manner as Example II. However, instead of using 36 g of Waxy 7350 starch and 144 g of HuberCarb Q325 $CaCO_3$ filler, 18 g of ICB® 3000 water-soluble starch and 162 g of HuberCarb Q325 $CaCO_3$ filler were used. After preparing the pre-mix, the ICB® 3000 was added at a mixing speed of 1000 rpm for about 10 minutes. The $CaCO_3$ filler was then added at a mixing speed of 1000 rpm for about 10 minutes. Mixing was then continued at a speed of 1250 rpm for about 5 minutes. 1.5 g of Latekoll® D was then added until the mixture was homogeneous.

Evaluation of Bakability Properties of Examples I-IV

The formulations of Examples I-IV were each evaluated to determine the effect of drying on the integrity of the formulation. For each example, the formulation was applied to a steel panel as a wet film of about 3 mm in thickness. The film was allowed to sit at room temperature for a dwell time of about 20 minutes. Each panel was then heated at a temperature of about 160° C. for about 30 minutes. The samples were then observed to determine if any cracks or bubbles were generated to determine the effect of heating on the integrity of the applied formulation. Examples II and III, which used a non-water soluble starch drying control agent, yielded a damping composition that was significantly improved over the control formulation of Example I, with substantially fewer cracks and bubbles. In contrast, Example IV used a water-soluble starch and produced a less satisfactory appearance with noticeable bubbling and cracking. Without wishing to be bound by any theory, it is believed that due to their relatively higher molecular weight and stronger 3-D gel structure, the non-water soluble starches produced superior results as compared to the water-soluble starches.

Example V

PVOH-Stabilized Vinyl Acetate Drying Control Agents—Control Formulation

To evaluate the effect of PVOH-stabilized vinyl acetate thickeners as drying control agents, an acrylic resin blend control formulation was first prepared without adding any of the thickener. A pre-mix of Acronal® DS 3502 and Acronal® DS 2159 was first prepared by blending 60 g of each latex in a high speed mixer at 1200 rpm for about 15 minutes. 180 g of HuberCarb Q325 $CaCO_3$ filler was then added at 800 rpm for about 10 minutes. The mixing speed was then increased to 1200 rpm for about 5 minutes. 1.5 g of Latekoll D was then added at 700 rpm for about 5 minutes.

Example VI

PVOH-Stabilized EVA Copolymer as a Drying Control Agent

A pre-mix comprising 60 g of Airflex® 426 (PVOH-stabilized EVA copolymer latex) and 60 g of Acronal® DS 2159 was prepared by mixing the two latexes at a speed of about 1200 rpm for about 15 minutes. 180 g of HuberCarb Q325 $CaCO_3$ filler was added to the pre-mix at a mixing speed of about 800 rpm for about 10 minutes. The mixing speed was then increased to about 1200 rpm for about 5 minutes.

Example VII

PVOH-Stabilized PVAc as a Drying Control Agent

A pre-mix comprising 40 g of Acronal® DS 2159, 40 g of Acronal® DS 3502, and 40 g Mowlith DN50 (PVOH-stabilized PVAc latex) was prepared by combining the three resins at a mixing speed of about 1200 rpm for about 15 minutes. To the pre-mix, 180 g of HuberCarb Q325 $CaCO_3$ filler was added at a mixing speed of about 800 rpm for about 10 minutes. The mixing speed was then increased to about 1200 rpm for about 5 minutes. 1.5 g of Latekoll® D was then added to the mixture at a mixing speed of about 700 rpm for about 5 minutes.

Example VIII

PVOH-Stabilized PVAc and PVOH-Stabilized EVA as Drying Control Agents

In this example, a damping composition comprising a PVOH-stabilized PVAc latex and a PVOH-stabilized EVA copolymer latex was prepared. To prepare the composition, 60 g of Airflex® 426 was added to 60 g of Mowlith DN50 at a mixing speed of about 1200 rpm for about 15 minutes. 180 g of HuberCarb Q325 $CaCO_3$ filler was then added to the mixture at a mixing speed of about 800 rpm for about 10 minutes. The mixing speed was then increased to about 1200 rpm for about 5 minutes.

Evaluation of Bakability Properties of Examples V-VIII

The bakability properties of Examples V-VIII were evaluated using the same procedure described above with respect to Examples I-IV. Unlike the control formulation (Example V), Examples VI-VIII all included one or more PVOH-stabilized vinyl acetate polymers and showed improved structural integrity over the control formulation, with substantially reduced bubble and crack formation.

Example IX

Alkali-Soluble Polymer Drying Control Agents

Two formulations were prepared to evaluate the effect of alkali-soluble polymer thickeners as drying control agents. The first formulation comprised a 50:50 mix of Acronal® DS 2159 and Acronal® DS 3502 with a Latekoll® D thickener. As mentioned above, Latekoll® D is an anionic dispersion of acrylic ester/carboxylic acid copolymer. Latekoll® D is rich in acid groups and is an alkali soluble thickener.

The control formulation was prepared by combining 60 g of Acronal® DS 2159 and 60 g of Acronal® DS 3502. To this mixture, 180 g of HuberCarb Q325 $CaCO_3$ filler was added. 1.5 g of Latekoll® D was then added to the mixture. A pre-mix of Acronal® DS 3502 and Acronal® DS 2159 was first prepared by blending 60 g of each latex in a high speed mixer at 1200 rpm for about 15 minutes. 180 g of HuberCarb Q325 $CaCO_3$ filler was then added at 800 rpm for about 10 minutes. The mixing speed was then increased to 1200 rpm for about 5 minutes. 1.5 g of Latekoll D was then added at 700 rpm for about 5 minutes.

Example X

Alkali-Soluble Polymer Drying Control Agents—Replacement of Alkali-Soluble Polymer with Acrysol RM-12W To evaluate the effect of alkali-soluble polymer drying control agents, the formulation of Example IX was modified by replacing Latekoll® D with an equal amount of Acrysol® RM-12W thickener, a hydrophobically modified ethylene oxide urethane rheology modifier supplied by Rohm and Haas. It is believed that Acrysol® RM-12W does not retard the rate of water evaporation to the extent that Latekoll® D does.

Evaluation of Bakability Properties of Examples IX and X

To evaluate the drying and bakability properties of Examples IX and X, both formulations were hand coated on e-coated test panels to form a three (3) mm wet film thickness. The panels were then allowed to dry at room temperature for about 20 minutes and then baked at about 160° C. for about 30 minutes. Three measurements of bubble height were taken at various locations on each panel. Example IX yielded an average bubble height of 4 mm. In contrast, Example X yielded an average bubble height of 9 mm. It is believed that the Latekoll® D formulation of Example IX yielded superior bubble height results owing to its ability to retard the rate of water evaporation during room temperature dwell and/or baking.

The damping compositions described herein may be applied to substrates in a variety of ways, including any conventional processes known to those skilled in the art, including without limitation casting, extrusion, spray coating, and swirl application. Referring to FIG. 2, a method for applying a damping composition such as those described previously will be described. FIG. 2 depicts an exemplary automated process for applying a damping composition and illustrates a partially-manufactured automotive vehicle on an assembly line. In the mixing process used to prepare the damping composition, the particle size of the solid components is preferably monitored or controlled to facilitate spraying. The mean particle size is generally less than 300 microns. However, mean particle sizes of less than 100 microns are preferred.

At the illustrated point in the manufacturing process, the automotive vehicle still has a partially-exposed floor panel 10 (substrate) to which a damping composition is being applied. It is desirable to include a vibration damper on floor panel 10 of the automotive vehicle. FIG. 2 illustrates a process of applying a damper composition by spraying the composition onto floor panel 10 using articulated robot arm 30. Articulated robot arm 30 has an applicator head 32 with a nozzle for dispensing fluid materials 34. The articulated robot arm 30 is electronically controlled by a control device (not shown) such as, for example, a computer workstation. The articulated robot arm 30 is controlled so that the robot arm is selectively positioned relative to the floor 10 of the automotive vehicle to dispense material thereon.

The applicator head 32 disposed on the articulated robot arm 30 is fluidly connected to at least one source of fluid material (not shown). In some embodiments, the sources of fluid materials are drums or bulk containers of fluid materials. Various known metering and fluid delivery components and systems can be used to deliver desired amounts of the fluid materials from the respective sources to applicator head 32.

Because of their baking and drying properties, the damping compositions described herein may advantageously be applied prior to heating processes, such as paint oven processes, without compromising the integrity of the damping composition. By way of example, an embodiment of a method of manufacturing a vibration-dampened vehicle substrate will now be described. In accordance with the embodiment, a damping composition is prepared by combining a water-based resin with a thickening agent that acts as a drying control agent by retarding the rate of water evaporation, as described above. The damping composition is then stored in a bulk container (not shown). The bulk container is then fluidly connected to robot arm 30. As floor 10 moves in the direction of the arrow shown in FIG. 2, the damping composition 34 is applied from applicator head 32 onto floor 10, preferably to a pre-selected thickness. Floor 10 is then allowed to sit at room temperature for a dwell time that is generally from about 20 minutes to about 40 minutes. In one exemplary embodiment, a dwell time of about 30 minutes is used. While sitting at room temperature, some amount of water in the damping composition 34 will evaporate. However, as discussed above, the thickening agents described herein will preferably retard the rate of water evaporation.

Floor 10 (or another component of a vehicle in which floor 10 is installed) may then be painted a desired color. After painting, floor 10 is placed in a paint oven to bake the applied paint. The bake oven temperature will range generally from about 120° C. to about 180° C. In one exemplary embodiment, a paint oven temperature of about 160° C. is used. The bake time will generally range from about 10 minutes to about 90 minutes. In an exemplary embodiment, a bake time of 30 minutes is used. As discussed above, the inclusion of the drying control agents described herein is believed to retard the rate of water evaporation during the baking process, thereby reducing the appearance of coating irregularities such as cracks or bubbles in the damping composition. Floor 10 may then be installed in a vehicle that is subject to vibrational disturbances. When the vehicle is in operation, it will transmit vibrations to the floor 10. However, the damping material described herein will dampen the transmitted vibration. Because the damping compositions described herein reduce coating irregularities and minimize the degree to which baking and drying processes compromise the structure of the damping material, overall damping performance is improved as compared to water-based resins lacking a drying control agent.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An article of manufacture, comprising:
   an automotive component to be subjected to external vibrational disturbances when inserted into a vehicle; and
   a composition applied onto said component, the composition capable of enduring paint bake heating operations, for dampening the vibrational disturbances, the composition comprising,
   a water-based resin, and
   a polysaccharide drying control agent wherein the polysaccharide comprises from about 0.1% to about 20% by weight of the damping composition.

2. The article of claim 1, wherein the water-based resin comprises an acrylic polymer.

3. The article of claim 1, wherein the water-based resin comprises a vinyl acetate polymer.

4. The article of claim 1, wherein the water-based resin comprises a styrene-butadiene copolymer.

5. The article of claim 1, wherein the water-based resin comprises a styrene-acrylic copolymer.

6. The article of claim 1, wherein the water-based resin comprises a vinyl-acrylic copolymer.

7. The article of claim 1, wherein the polysaccharide comprises starch.

8. The article of claim 1, wherein the polysaccharide comprises cellulose, the cellulose comprising from about 1% to about 10% by weight of the damping composition.

9. The article of claim 7, wherein the starch is insoluble in water.

10. An article of manufacture, comprising:
    an automotive component to be subjected to external vibrational disturbances when inserted into a vehicle; and
    a composition applied onto said component for dampening the vibrational disturbances, the composition capable of enduring paint bake heating operations and the composition comprising,
    a water-based resin; and
    a drying control agent comprising an alkali-soluble copolymer latex of a carboxylic acid and an acrylic ester wherein the drying control agent comprises from about 0.1% to about 2.0% by weight of the damping composition.

11. The article of claim 10, wherein the water-based resin comprises an acrylic polymer.

12. The article of claim 10, wherein the water-based resin comprises a vinyl acetate polymer.

13. The article of claim 10, wherein the water-based resin comprises a styrene-butadiene copolymer.

14. The article of claim 10, wherein the water-based resin comprises a styrene-acrylic copolymer.

15. The article of claim 10, wherein the water-based resin comprises a vinyl-acrylic copolymer.

16. The article of claim 10, wherein the drying control agent further comprises an acrylic polymer.

17. An article of manufacture, comprising:
    an automotive component to be subjected to external vibrational disturbances when inserted into a vehicle; and
    a composition permanently applied onto said component for dampening the vibrational disturbances, the composition capable of enduring paint bake heating operations and the composition comprising
    a water-based resin; and
    a drying control agent comprising a polyvinyl alcohol-stabilized latex, wherein polyvinyl alcohol is present in the damping composition in an amount of from about 0.1% to about 0.3% by weight of the damping composition.

18. The article of claim 17, wherein the water-based resin comprises an acrylic polymer.

19. The article of claim 17, wherein the water-based resin comprises a vinyl acetate polymer.

20. The article of claim 17, wherein the water-based resin comprises a styrene-butadiene copolymer.

21. The article of claim 17, wherein the water-based resin comprises a styrene-acrylic copolymer.

22. The article of claim 17, wherein the water-based resin comprises a vinyl-acrylic copolymer.

23. The article of claim 17, wherein the drying control agent is a polyvinyl alcohol-stabilized vinyl acetate latex.

24. The article of claim 23, wherein the polyvinyl alcohol-stabilized vinyl acetate latex is selected from the group consisting of a polyvinyl alcohol-stabilized ethylene-vinyl acetate copolymer latex, a polyvinyl alcohol-stabilized polyvinyl acetate latex, and mixtures thereof.

25. The article of claim 17, wherein the water-based resin is selected from the group consisting of a polyvinyl alcohol-stabilized ethylene-vinyl acetate copolymer latex and a polyvinyl alcohol-stabilized polyvinyl acetate latex, and the drying control agent comprises the other of the polyvinyl alcohol-stabilized ethylene-vinyl acetate copolymer latex and the polyvinyl alcohol-stabilized polyvinyl acetate latex.

26. A method of manufacturing a product having a vibration-dampened component, the method comprising:

applying the composition of claim 1 to an automotive component to be subjected to external vibrational disturbances when inserted into a vehicle.

27. The method of claim 26, further comprising drying the composition.

28. The method of claim 26, further comprising heating the component after applying the composition to the component.

29. The method of claim 28, wherein the heating is carried out at a temperature of from about 120° C. to about 180° C. for a period of from about 10 minutes to about 90 minutes.

30. The method of claim 26, wherein said applying the composition to the component comprises spraying the composition on the substrate.

31. The method of claim 26, wherein the component is selected from the group consisting of a vehicle floor, a vehicle floor panel, a portion of a truck, and a portion of a dashboard.

32. A method of manufacturing a product having a vibration-dampened component, the method comprising:
applying the composition of claim 10 to an automotive component to be subjected to external vibrational disturbances when inserted into a vehicle.

33. A method of manufacturing a product having a vibration-dampened component, the method comprising:
applying the composition of claim 17 to an automotive component to be subjected to external vibrational disturbances when inserted into a vehicle.

34. An article of manufacture, comprising:
an automotive component to be subjected to external vibrational disturbances when inserted into a vehicle; and
a composition applied onto said component, the composition capable of enduring paint bake heating operations, the composition comprising,
a water-based resin; and
a drying control agent comprising a dried powder of polyvinyl alcohol.

35. The article of claim 34 wherein the automotive component is a vehicle floor or a vehicle floor panel.

36. The article of claim 34 wherein the automotive component comprises a metal substrate.

* * * * *

UNITED STATES PATENT AND TRADEMARK OFFICE
CERTIFICATE OF CORRECTION

| | | |
|---|---|---|
| PATENT NO. | : 8,163,380 B2 | Page 1 of 1 |
| APPLICATION NO. | : 11/731654 | |
| DATED | : April 24, 2012 | |
| INVENTOR(S) | : Frank Hoefflin et al. | |

It is certified that error appears in the above-identified patent and that said Letters Patent is hereby corrected as shown below:

At column 13, claim number 31, line number 16, change "truck" to "trunk"

Signed and Sealed this
Thirty-first Day of July, 2012

David J. Kappos
*Director of the United States Patent and Trademark Office*